United States Patent
Nolan et al.

[11] Patent Number: 6,044,121
[45] Date of Patent: Mar. 28, 2000

[54] METHOD AND APPARATUS FOR RECOVERY OF TIME SKEWED DATA ON A PARALLEL BUS

[75] Inventors: Scott W. Nolan, Milford; Nigel T. Poole, Natick; Ronald Salett, Framingham, all of Mass.

[73] Assignee: Cabletron Systems, Inc., Rochester, N.H.

[21] Appl. No.: 08/898,148

[22] Filed: Jul. 22, 1997

[51] Int. Cl.[7] .................................................. H04L 7/00
[52] U.S. Cl. .................................... 375/354; 370/503
[58] Field of Search .............................. 375/354, 362, 375/365, 368, 326, 363, 373, 371; 371/1; 370/514, 100.1, 101, 102

[56] References Cited

U.S. PATENT DOCUMENTS

| | | | |
|---|---|---|---|
| 5,359,630 | 10/1994 | Wade et al. | 375/354 |
| 5,533,072 | 7/1996 | Georgiou et al. | 375/371 |
| 5,625,654 | 4/1997 | Pinier et al. | 375/365 |

FOREIGN PATENT DOCUMENTS

| | | |
|---|---|---|
| 0 263 418 | 4/1988 | European Pat. Off. . |
| 0 311 448 | 4/1989 | European Pat. Off. . |
| WO 93 18463 | 9/1993 | WIPO . |
| WO 97 18660 | 5/1997 | WIPO . |

*Primary Examiner*—Stephen Chin
*Assistant Examiner*—Thomas E McKiernan
*Attorney, Agent, or Firm*—Wolf, Greenfield & Sacks, P.C.

[57] ABSTRACT

An apparatus and method for receiving time skewed data from a parallel data bus. A data transfer on the parallel data bus is preceded by a start-of-cell delimiter consisting of a predetermined sequence of pulses on each of the data signals. The data is received from the bus by receive logic employing a local clock. Sampling logic is used to sample each of the data signals received from the bus at a rate which is higher than the local clock rate. Sample registers store a plurality of samples of corresponding data signals, the number of samples stored being large enough to store at least some of the pulses constituting the start-of-cell delimiter. Start-of-cell detect and center select logic is used for determining that a start-of-cell delimiter is stored in each of the sample registers, and for determining which of the samples stored in each of the sample registers represents the approximate center sample of one of the pulses of the start-of-cell delimiter. These center samples correspond to the data signals on the bus, but are de-skewed and synchronous with the local clock.

20 Claims, 16 Drawing Sheets

| b18 | b17 | b16 | b15 | b14 | b13 | b12 | b11 | b10 | b9 | b8 | b7 | b6 | b5 | b4 | b3 | b2 | b1 | b0 |
|---|---|---|---|---|---|---|---|---|---|---|---|---|---|---|---|---|---|---|
| x | x | x | x | x | 0 | 0 | x | x | x | x | 1 | 1 | 1 | 1 | 0 | 0 | 0 | 0 |
| x | x | x | x | 0 | 0 | x | x | x | x | 1 | 1 | 1 | 1 | 0 | 0 | 0 | 0 | x |
| x | x | x | 0 | 0 | x | x | x | x | 1 | 1 | 1 | 1 | 0 | 0 | 0 | 0 | x | x |
| x | x | 0 | 0 | x | x | x | x | 1 | 1 | 1 | 1 | 0 | 0 | 0 | 0 | x | x | x |
| x | 0 | 0 | x | x | x | x | 1 | 1 | 1 | 1 | 0 | 0 | 0 | 0 | x | x | x | x |
| 0 | 0 | x | x | x | x | 1 | 1 | 1 | 1 | 0 | 0 | 0 | 0 | x | x | x | x | x |

METHOD AND APPARATUS FOR RECOVERY OF TIME SKEWED DATA ON A PARALLEL BUS

FIELD OF THE INVENTION

The invention relates to the recovery of parallel data by a receiving device, and more particularly to the recovery of time-skewed parallel data from a backplane bus such that it can be further processed within a synchronous clock domain.

BACKGROUND OF THE INVENTION

It is well known in the art of digital data transfer that high data rates can be achieved by transferring data over a parallel data bus. For a given bus rate, the bus bandwidth measured in bits-per-second is equivalent to the bus rate times the number of data signals comprising the parallel data bus.

A typical system might include a number of modules which interface to a backplane module. The modules intercommunicate via a parallel bus on the backplane module. A transmitting module transmits data over the backplane bus synchronous with a clock on the transmitting module; thus, all transitions on all signal lines on the backplane bus leave the transmitting module in a synchronous relationship to the clock on the transmitting module. Receiving modules also implement a clock at the bus rate, and receive the data on the backplane bus synchronous to the receive clock.

In such prior art systems, it is necessary to ensure that the receive clocks have a specific phase relationship to the transmit clock to ensure proper data recovery. For example, the transmit clock may be transmitted to the receiving modules over the backplane, the receive clocks then being derived from it.

In any system where a parallel bus is implemented on a backplane module, there will be some amount of time skew between the bus signals themselves and between the bus signals and the receive clock at the destination, since the signals are subject to transmission delays due to capacitive loading and line lengths. In low speed systems, this time skew is a small percentage of the overall clock period; thus, as long as the receive clock is in phase with the transmit clock, the skew does not interfere with data recovery and can therefore be ignored.

Parallel buses, however, reach certain limitations as clock rates are increased. In particular, where a high-speed parallel bus is implemented on a backplane module such that the various signals making up the parallel bus must travel a significant distance between their source and destination, transmission delays on the data signals due to loading variations and line lengths cause relatively large time skews between the signals themselves and between the signals and receive clocks. As these time skews become a significant percentage of the clock frequency, they can no longer be ignored. Such time skews can preclude direct use of the receive clock for clocking the bus signals into a receive register or latch, since setup and/or hold time violations might occur, causing faulty data reception. The skew problem becomes more pronounced at higher clock rates, because as clock rates increase, data signals need travel only a short distance before these difficulties are encountered.

Prior art solutions to the skew problem typically center on minimizing the bus skew seen at the receiving module, through implementation, for example, of expensive backplane module manufacturing techniques employing impedance matching of the data lines constituting the parallel bus, or by minimizing the allowable length of the parallel bus. As bus clock rates have continued to increase, the expense and limitations of these prior solutions have become unacceptable.

SUMMARY OF THE INVENTION

In accordance with the principles of the invention there is provided an apparatus and method for receiving time skewed data from a parallel data bus. A data transfer on the parallel data bus is preceded by a start-of-cell delimiter consisting of a predetermined sequence of pulses on each of the data signals. The data is received from the bus by receive logic employing a local clock.

Sampling logic is used to sample each of the data signals received from the bus at a rate which is higher than the local clock rate. A plurality of sample registers are provided, each sample register corresponding to one of the bus data signals. Each sample register stores a plurality of samples of the corresponding data signal, the number of samples stored being large enough to store at least some of the pulses constituting the start-of-cell delimiter. The samples are output synchronous with the local clock. Start-of-cell detect and center select logic is used for determining that a start-of-cell delimiter is stored in each of the sample registers, and for determining which of the samples stored in each of the sample registers represents the approximate center sample of one of the pulses of the start-of-cell delimiter. These center samples correspond to the data signals on the bus, but are de-skewed and synchronous with the local clock.

In accordance with a further aspect of the invention, parallel data can be recovered even when there is more than one bit time of skew between the data signals and the local clock. Accordingly, a delay register accepts the center samples provided by the center selection logic and provides as output a plurality of delayed signals, each delayed signal corresponding to one of the data signals on the bus. Delay logic is used to determine that some of the start-of-cell delimiters were stored in the sample register a local clock cycle later than the remaining start-of-cell delimiters. The delay logic produces as output the delayed center samples corresponding to the data signals for which a start-of-cell delimiter was stored a local clock cycle prior to the other start-of-cell delimiters, and produces as output the center samples corresponding to the other data signals.

The present invention thereby provides a significant advance in the art of parallel data reception, in that received data can be properly processed despite relatively large time skews between the data signals and the local clock. The inventive concepts herein disclosed thereby allow implementation of longer parallel bus lengths using relatively inexpensive module manufacturing techniques to transfer parallel data at higher data transfer rates than previously possible.

DETAILED DESCRIPTION OF THE PREFERRED EMBODIMENT

Figure 1:
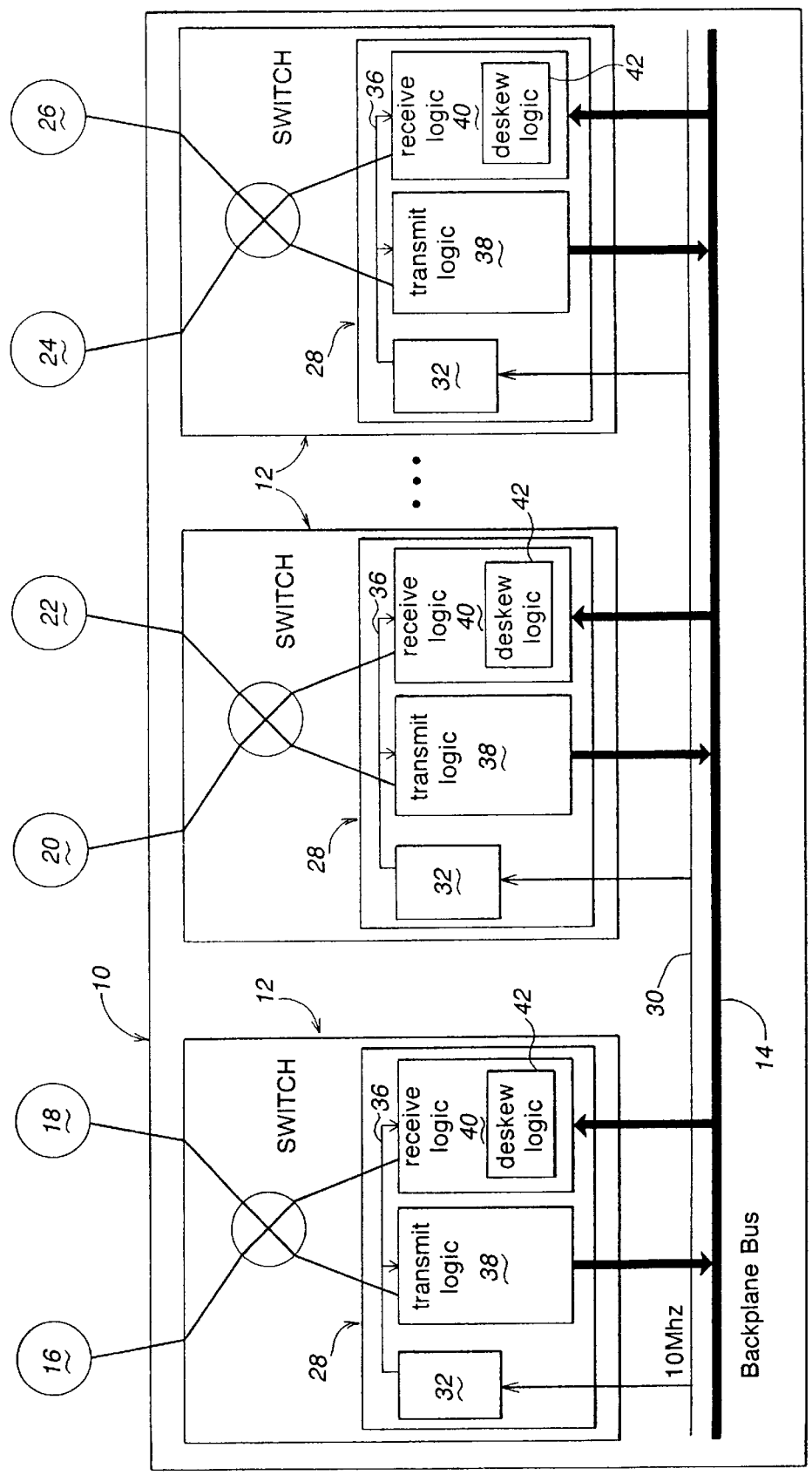
FIG. 1 is a block diagram of a network switch employing the deskew logic of the present invention.

Referring now to FIG. 1, there is shown a network switch which incorporates the present invention. A network switch chassis 10 has installed within it a number of switching modules 12. The switching modules 12 are interconnected via backplane bus 14. Each of nodes 16, 18, 20, 22, 24, and 26 is connected to one of the switching modules 12. In the event that, for example, node 16 communicates with node 18, a data transfer between the nodes is switched through the switching module 12 to which the two nodes are connected. However, if node 16 communicates with node 20, then the data transfer between these two nodes utilizes the backplane bus 14.

Each of the switching modules 12 includes a bus interface 28 coupled to the backplane bus 14. A 10 Mhz clock signal 30 is distributed amongst the switching modules 12 via the backplane bus 14. Within each bus interface 28 there is included clock generation logic 32 which uses the 10 Mhz clock signal received from the backplane bus 14 to generate a 50 Mhz local clock signal 36 for use by the bus interface 28. The bus interface 28 contains transmit logic 38 for transmitting data on the backplane bus 14 in synchronism with the local clock signal 36, and receive logic 40 for receiving data from the backplane bus 14. Data received from the backplane bus 14 is processed through deskew logic 42, and is then forwarded in synchronism with the local clock signal 36 for further processing by the switching module 12.

Figure 2:
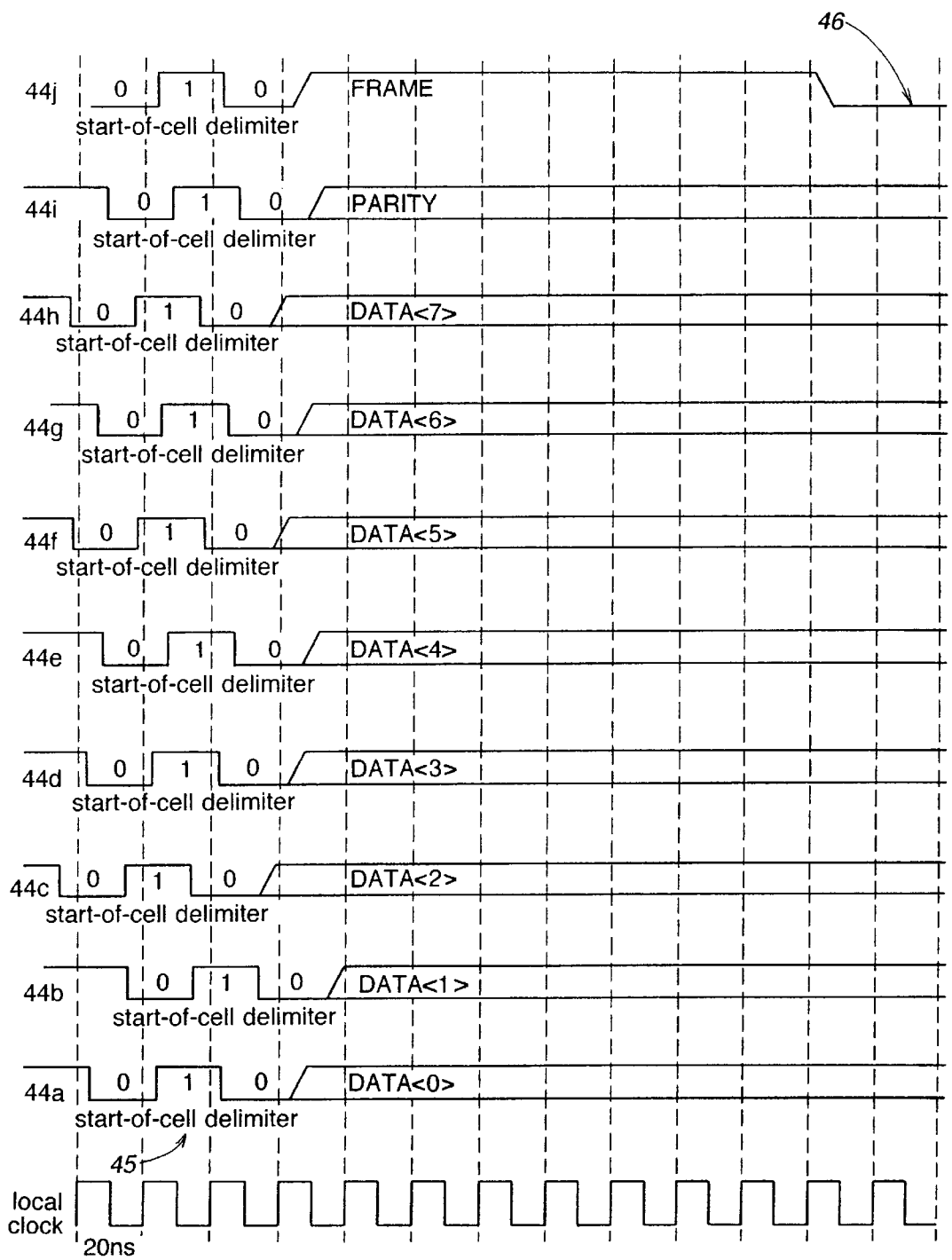
FIG. 2 is a timing diagram depicting a data transfer on the backplane bus shown in FIG. 1.

Data is transferred over the backplane bus 14 in a bytewise parallel manner as shown in FIG. 2. The backplane bus 14 contains 10 separate bus signals 44: backplane_data<7:0> signals 44a–h, a backplane_parity signal 44i, and a backplane_frame signal 44j. The backplane bus rate as herein embodied is 50 MHZ that is, a byte of data is transferred every 20 ns.

Individual data transfers from a given switching module 12 over the backplane bus 14 are differentiated by a start-of-cell delimiter 45 and an end-of-cell indicator 46. A data transfer begins with a start-of-cell delimiter 45 which is asserted on each of the bus signals 44, herein shown as a three bit sequence consisting of a binary '0' followed by a '1' followed by a '0'. The backplane_frame signal 44j is then asserted, indicating that a valid data transfer is occurring. A variable number of bytes of data are then transferred in a bytewise parallel manner via the backplane_data<7:0> signals and the backplane_parity signal. The backplane_frame signal 44j is deasserted just prior to the last two bytes of data transferred over the backplane_data<7:0> and backplane_parity signals. The deassertion of the backplane_frame signal 44j serves as the end-of-cell indicator 46.

The bus signals 44 making up the data transfer are depicted in the Figure as they might arrive at a receiving switching module 12. As seen, though each of the backplane_data<7:0>, backplane_parity, and backplane_frame signals 44 making up the data transfer are transmitted by a given switching module 12 in synchronism with the transmitting module's local clock signal 36, the backplane_data<7:0>, backplane_parity, and backplane_frame signals may not necessarily arrive at the receiving switching module 12 in the same phase relationship with each other and with the receiving switching module 12 local clock signal 36. Rather, the bits can arrive in a time-skewed relationship to each other and to the local clock signal 36 due to differences in the transmission delays for each signal over the backplane bus 14. As seen for instance on the backplane_data<1> signal, the skew between the bus signal 44c and the local clock 36 can be up to 20 ns or 1 bit time. Such skews preclude the use of the local clock 36 for clocking the bus signals 44 into a receive register or latch, since setup and/or hold time violations might occur, causing faulty data reception. Each switching module's bus interface 28 therefore contains the deskew logic 42 to compensate for skew between the various bus signals 44 making up the backplane bus 14 and the receiving switching module's local clock 36.

Figure 3:
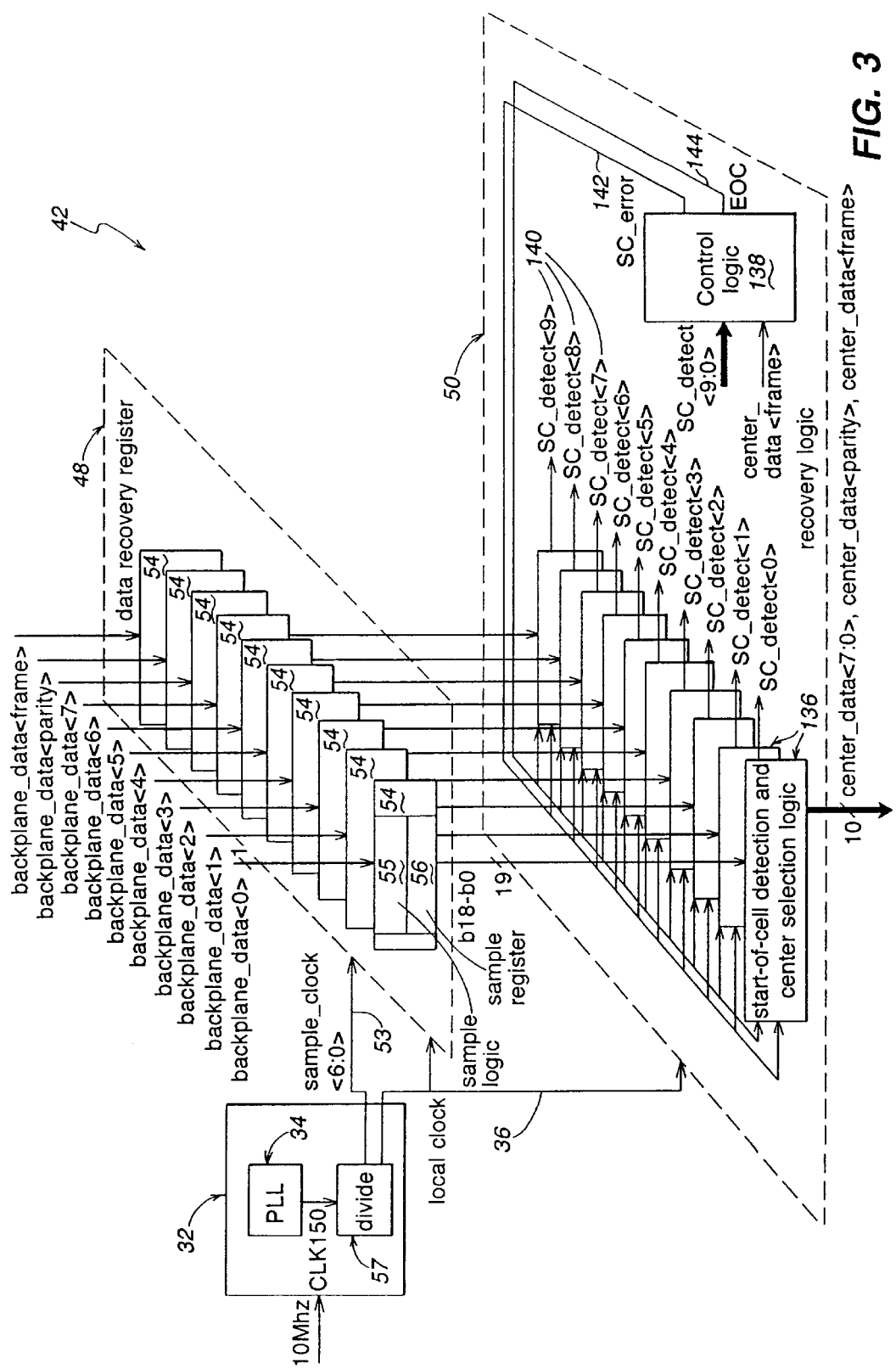
FIG. 3 is a block diagram of the deskew logic shown in FIG. 1.

Referring now to FIG. 3, there is shown the deskew logic 42 for a given switching module 12. The major components of the deskew logic 42 include a data recovery register 48 and recovery logic 50. These components interoperate to deskew the backplane bus signals relative to the 50 Mhz local clock generally as follows: the clock generation logic 32 is used to produce sample clock signals 53 for high-speed sampling of each of the backplane bus signals 44. The sample clock signals 53 allow sampling of the backplane bus signals 44 at a rate greater than 50 Mhz bus rate. The sample clocks 53 are used to clock data into the data recovery register 48. The data recovery register 48 includes bit recovery registers 54, one for each of the backplane bus signals 44. Each bit recovery register 48 includes sampling logic 55, which uses the sample clocks 53 to sample the corresponding backplane bus signal 44. The sampling logic 55 feeds a sample register 56, which stores a number of samples sufficient to store an entire instance of the start-of-cell delimiter 45 for a given bus signal 44. These samples are output from the sample register 56 synchronous with the local clock signal. The recovery logic 50 is used to determine that each sample register 56 presently stores a start-of-cell delimiter 45. The recovery logic 50 then analyzes one of the stored pulses constituting the start-of-cell delimiter to determine which of the samples stored in the sample register 56 represents the approximate center sample of the pulse. The location in the sample register 56 which stores this center sample represents the corresponding recovered deskewed backplane bus signal 44 synchronous with the local clock, and is used as such by the switching module 12 for the duration of the data transfer.

Figure 4:
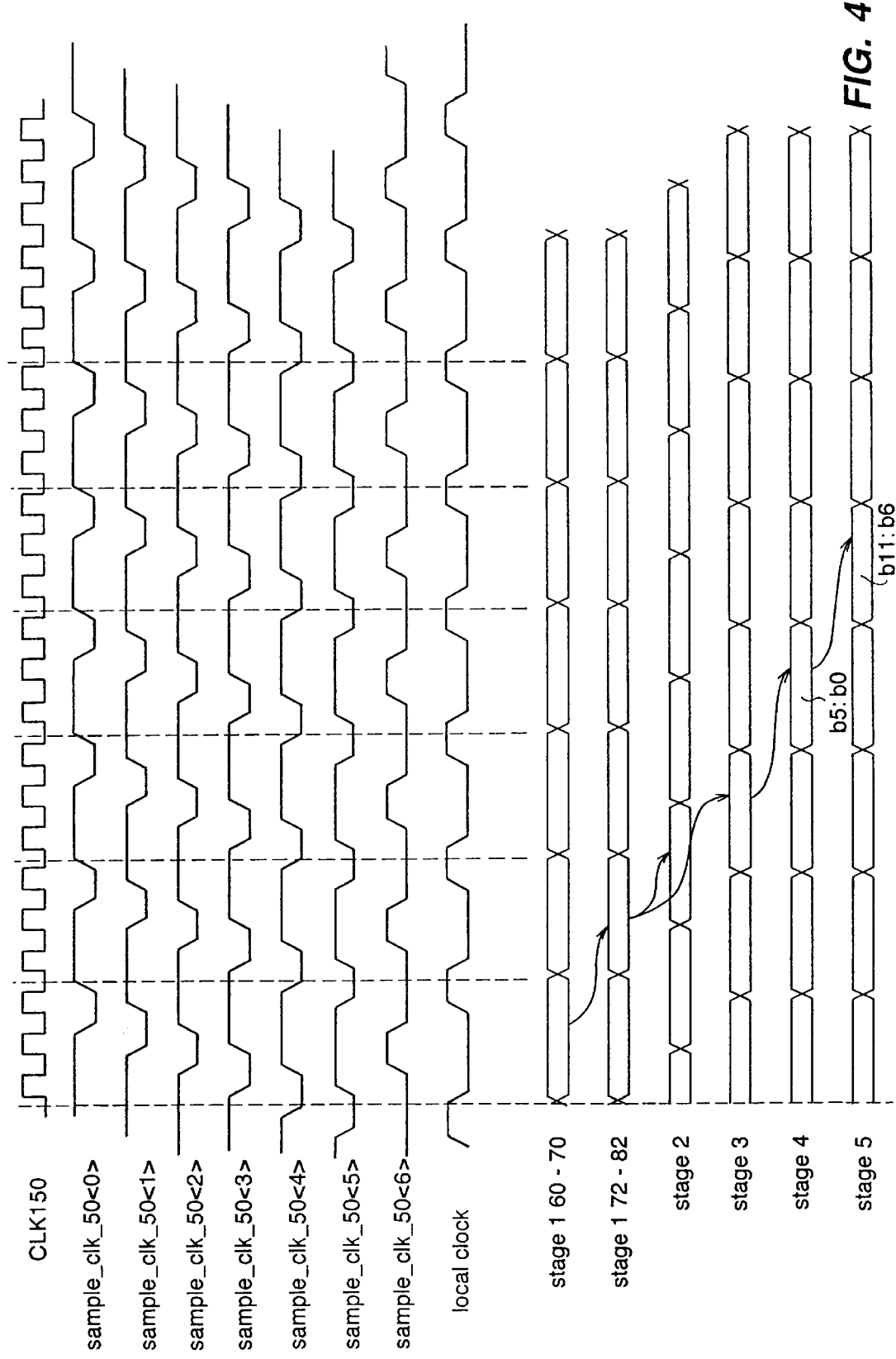
FIG. 4 is a timing diagram of the clock generation logic shown in FIG. 3.

The various components comprising the deskew logic 42 are now described in further detail. The clock generation logic 32 operates to provide sample clocks 53 as shown in FIG. 4. The clock generation logic 32 receives the 10 Mhz system clock 30 and multiplies it via the PLL 34 to 150 Mhz, which is then divided down by divide-down logic 57 to six 50 Mhz clocks in various phase relationships. As shown, the CLK150 signal is divided down to provide the 50 Mhz local clock 36 and 50 Mhz sample clock signals 53 of various phases: sample_clk50<0>, sample_clk50<1>, sample_clk50<2>, sample_clk50<3>, sample_clk50<4>, sample_clk50<5>, sample_clk50<6>, and the local clock 36. The divide-down logic 57 which produces these signals may do so in any number of ways well known in the art.

Note that, between the rising edges of the local clock signal, the rising edges of the various sample_clk<5:0> signals provide 6 different sampling points. For each of bus signals 44 making up the backplane bus 14, the sample_clk<5:0> signals are used by the sampling logic 55 to sample each of the bus signals 44 between local clock 36 edges. The various samples are later used by the recovery logic 50 to compensate for skew between each of the bus signals 44 and the local clock signal 36. Though the preferred embodiment implements six times oversampling, it will be understood by one skilled in the art that a greater or fewer number of samples could be effectively employed, the minimum sampling rate being dependent upon the signalling characteristics of the backplane bus.

Figure 5:
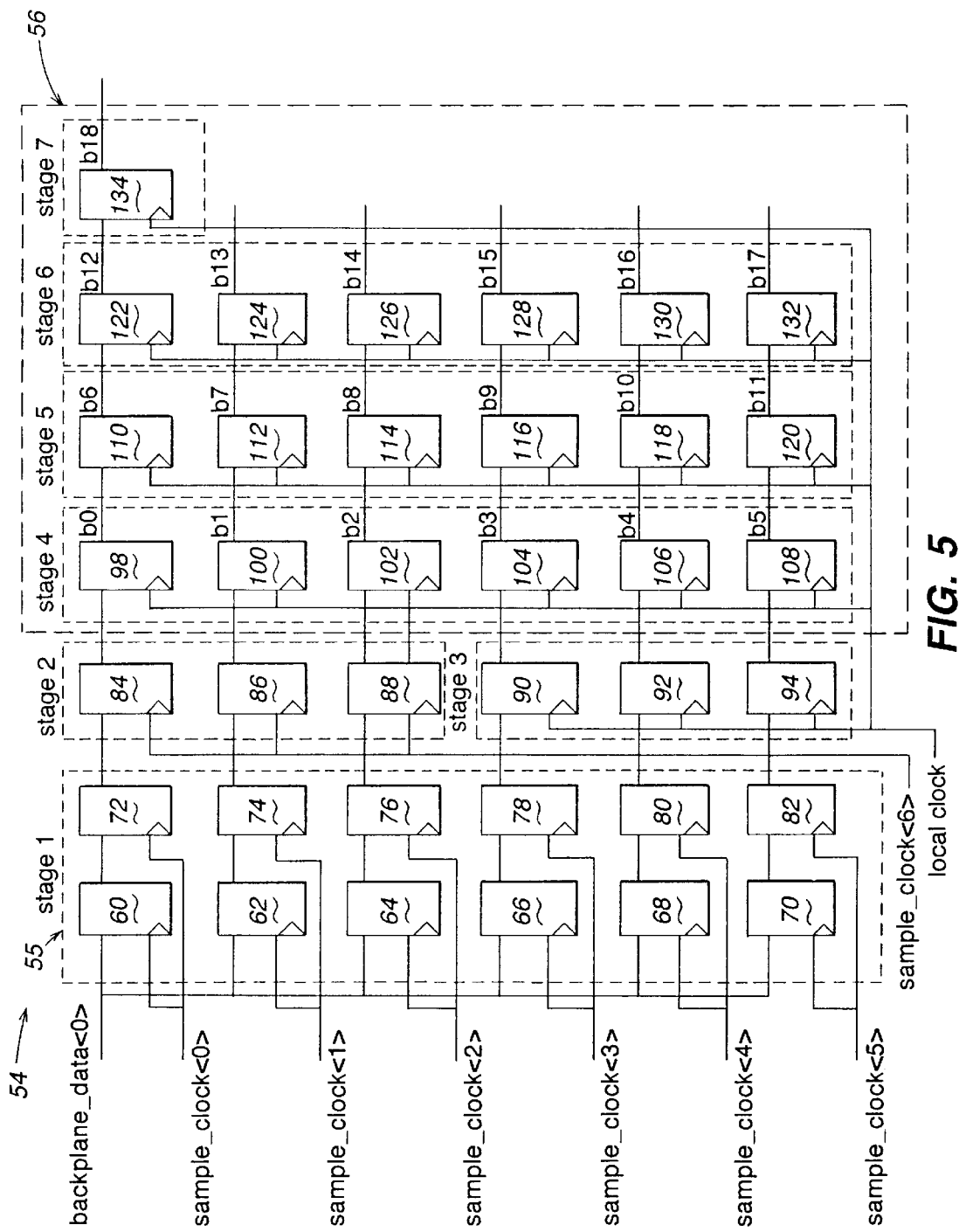
FIG. 5 is a block diagram of one of the bit recovery registers shown in FIG. 3.

As seen in FIG. 3, the data recovery register 48 includes 10 bit recovery registers 54, one coupled to each of the bus signals 44. Referring now to FIG. 5, there is shown in detail one of the bit recovery registers 54. The bit recovery register 54 contains 7 stages. The timing relationships between these stages is shown in FIG. 4. Stage 1, which makes up the sampling logic 55, contains bit registers 60 82, each of which may be for example a D flip-flop. The inputs of each of the bit registers 60–70 are fed by a single one of the backplane bus signals 44 making up the backplane bus 14. In the figure, the bit recovery register 54 receives the backplane_data<0> signal. Bit registers 60 and 72 are clocked by sample_clk<0>, and form a dual-rank synchronizer. Similarly, bit registers 62 and 74 are clocked by sample_clk<1>, bit registers 64 and 76 are clocked by sample_clk<2>, bit registers 66 and 78 are clocked by sample_clk<3>, bit registers 68 and 80 are clocked by sample_clk<4>, and bit registers 70 and 82 are clocked by sample_clk<5>. Thus, at the output of the sampling logic 58 there are provided 6 different samples of the backplane_data<0> signal.

It should be noted that, though the sampling logic described with reference to the preferred embodiment utilizes several 50 Mhz clocks of differing phases in order to capture six different samples of a backplane_data signal 44 during a local clock cycle, alternate arrangements exist to sample the data at a rate higher than the local clock rate. For instance, a single higher rate clock signal could be used, with the stage 1 logic arranged as a serial register clocked by the single higher rate clock.

Stage 2 clocks the first 3 samples of the backplane_data<0> signal into bit registers 84, 86, and 88, while stage 3 clocks the other 3 samples of the backplane_data<0> signal into bit registers 90, 92, and 94. The registers 84, 86, and 88 of stage 2 are clocked by sample_clk<6>, while the registers 90, 92, and 94 of stage 3 are clocked by the local clock 36. The stage 2 and stage 3 registers are clocked by different clocks in order to optimize the setup and hold times of the input data signals to the respective clock edge. As seen in FIG. 2, the rising edge of the local clock signal can easily be used to clock data which was stored on the rising edges of sample_clks<3:5>, but the rising edge of the local clock signal and sample_clk<1> are so close together as to potentially cause a setup time violation on bit register 86. Sample_clk<6>, however, has an optimal timing relationship to data clocked off of the sample_clk<0:2> edges, and is thus used to clock stage 2. It should be noted that the invention is not so limited; that is, the stage 2 and stage 3 registers are shown clocked in a manner that is specific to the implementation shown. For instance, in implementations using sample clock signals with different timing relationships relative to the local clock signal, it may be possible to combine stages 2 and 3 to be clocked by the local clock, or to eliminate stages 2 and 3.

Stages 4 through 7 make up the 19 bit sample register 56. Stage 4 clocks the first 6 samples of the backplane_data<0> signal into sample bit registers 98–108 synchronous with the local clock. On the next local clock edge, these samples are clocked into the bit registers 110–120 making up Stage 5, while the next 6 samples of the backplane_data<0> signal are clocked into stage 4. On the following local clock edge, these samples are clocked into the sample bit registers 122–132 making up stage 6, and finally, on the next local clock edge, into the sample bit register 134 making up stage 7. The sample register 56 now contains 19 samples of the backplane_data<0> signal taken over 4 local clock edges.

The contents of the sample register 56 is used by the recovery logic 50 to detect start-of-cell delimiters 45 and to determine the center sample of one of the pulses of the start-of-cell delimiter, thereby providing optimally sampled data for use by the switching module 12. In FIG. 3, the recovery logic is shown to include 10 instances of start-of-cell detect and center select logic 136, each fed by one of the sample registers 56 Each instance of the start-of-cell detect and center select logic 136 is coupled to control logic 138. Each instance of the start-of-cell detect and center select logic 136 produces an SC_detect signal 140. The SC_detect signals<9:0> are fed the control logic 138, which feeds back SC_error and EOC signals 142 and 144 to each instance of the start-of-cell detect and center select logic 136.

The recovery logic 50 operates generally as follows. Each instance of the start-of-cell detection and center selection logic 136 monitors the contents of the corresponding sample register for the presence of a start-of-cell delimiter 45. When a valid start-of-cell delimiter 45 is detected, the start-of-cell detect and center select logic asserts its SC_detect signal, and determines which of the sample bit registers 98–134 holds the approximate center sample of the logic '1' pulse in the start-of-cell delimiter. The bit register holding this center sample is then provides as output a center_data signal, which is a de-skewed and synchronized version of the corresponding backplane_data signal, for the duration of the data transfer. The control logic 138 monitors the SC_detect<9:0> signals to determine whether a start-of-cell delimiter has been detected on all backplane bus signals 44 within a single local clock 36 period. If so, the data_valid bit is asserted. If, however, a start-of-cell delimiter has not been detected on one or more backplane bus signals within a single local clock period, then either there is a general bus error, or the bus skew exceeds a bit time on at least one of the bus signals 44. The SC_error signal is then asserted, indicating a start-of-cell error. In either case, the control logic 138 awaits the end of the data transfer. When the end of the data transfer is detected, the control logic 138 asserts the EOC signal, thereby resetting each instance of the start-of-cell detect and center select logic 136 to detect the next start-of-cell delimiter 45.

The start-of-cell detect and center select logic 136 should indicate detection of a valid start-of-cell delimiter 45 while rejecting incorrect sequences. In the present embodiment, a start-of-cell delimiter 45 consists of a logic '0' followed by a logic '1' followed by a logic '0' (see FIG. 3). Thus, the start-of-cell detect and center select logic 136 should detect a '010' sequence as a valid start-of-cell delimiter, while rejecting sequences such as '011' or '1110'. Due to bus skew and delay differences which can result in an uneven duty cycle on a given bus signal line, valid logic levels may be anywhere between 2 and 8 samples long. In addition, noise may result in a logic '0' or '1' pulse that can be detected for a single sample. Thus, the start-of-cell detect and center select logic 136 as embodied herein requires that a start-of-cell '1' pulse and trailing '0' pulse be at least a minimum width (or number of samples), and that a start-of-cell '1' pulse not exceed a maximum width (number of samples), and that the start-of-cell leading '0' pulse be a minimum width (number of samples). Based on the implemented sampling rate of 300 Mhz (6 samples per 50 Mhz clock period), the start-of-cell detect and center select logic 136 requires the following sequence: a leading logic '0' of minimum duration 2 samples, followed by logic '1' of minimum duration 4 samples and maximum duration 8 samples, followed by a logic '0' of minimum duration 4 samples. Thus, since 14 bits are required to store a valid sample, and that sample may be captured on any of 6 different sample_clk edges, the sample register 56 contains 19 sample bit registers 98–134, as shown in FIG. 5. It should be noted, however, that in alternative implementations, data transfers might be preceded by relatively long start-of-cell delimiters. In this case, it may be sufficient to store only a portion of the start-of-cell delimiter in order to properly determine that a delimiter has been captured and to determine the center sample of one of the pulses in the delimiter.

Figures 6, 7:
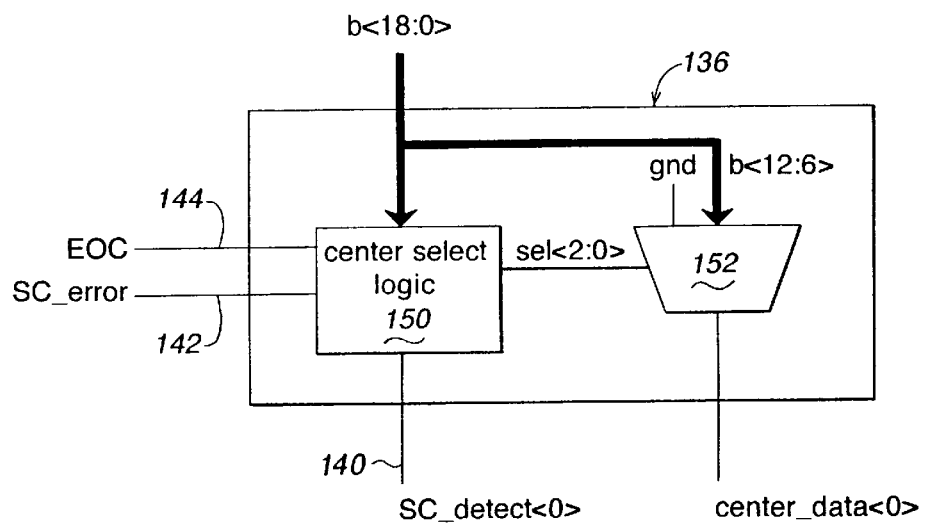
FIG. 6 represents the possible contents of one of the sample registers of FIG. 3 when it stores a start-of-cell delimiter.
FIG. 7 is a block diagram of the start-of-cell detect and center select logic shown in FIG. 3.
Figure 8A:
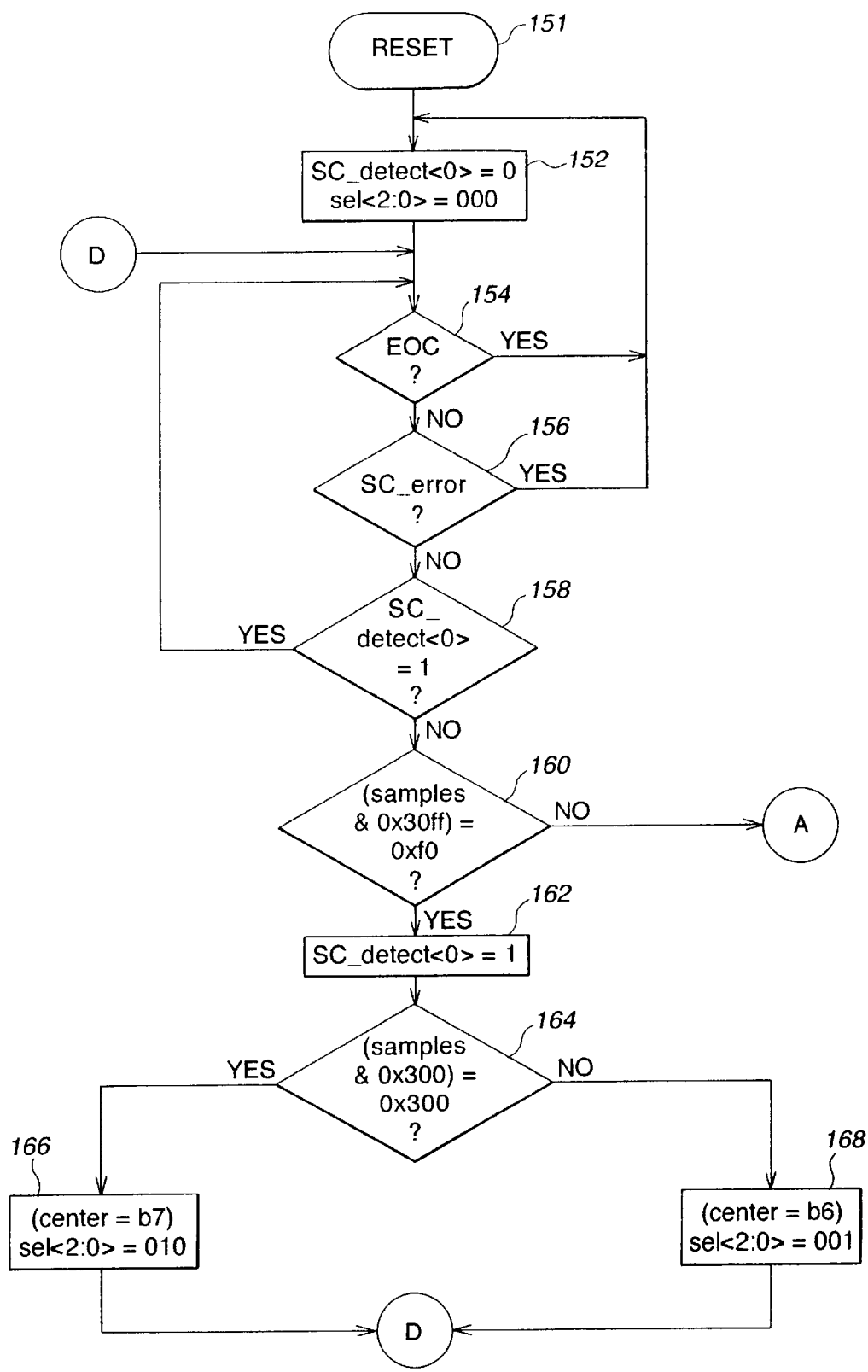
FIGS. 8a–d are a flow diagram representing the operation of the start-of-cell detect and center select logic shown in FIG. 6.
Figure 8B:
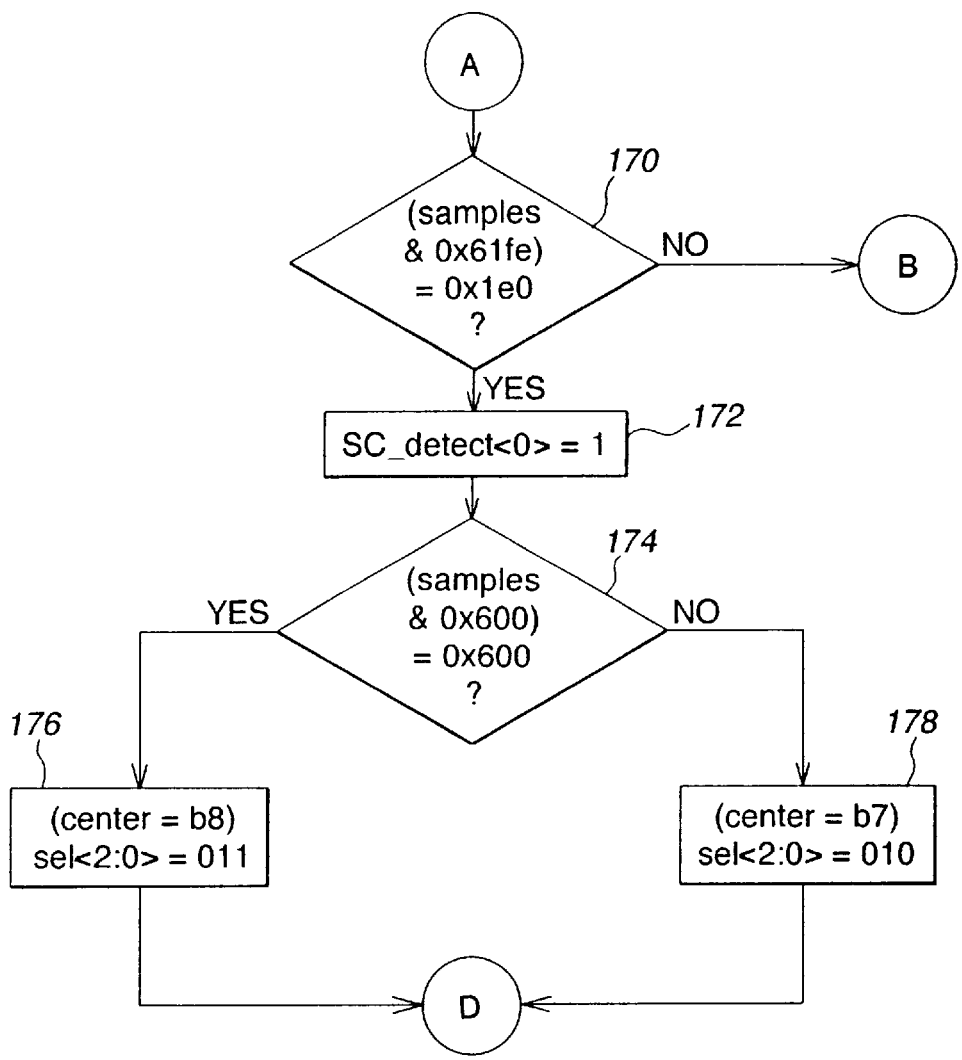
Figure 8C:
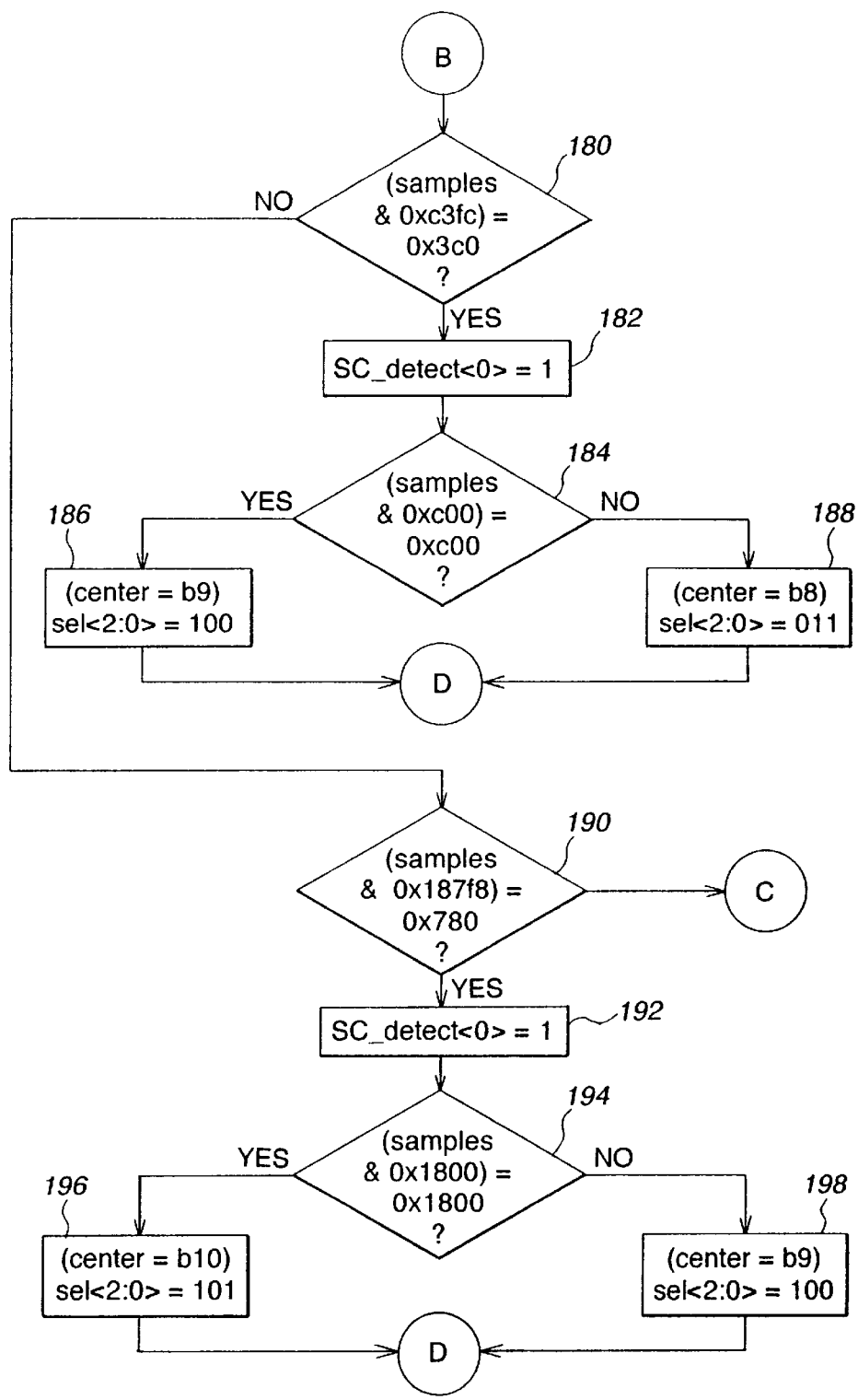
Figure 8D:
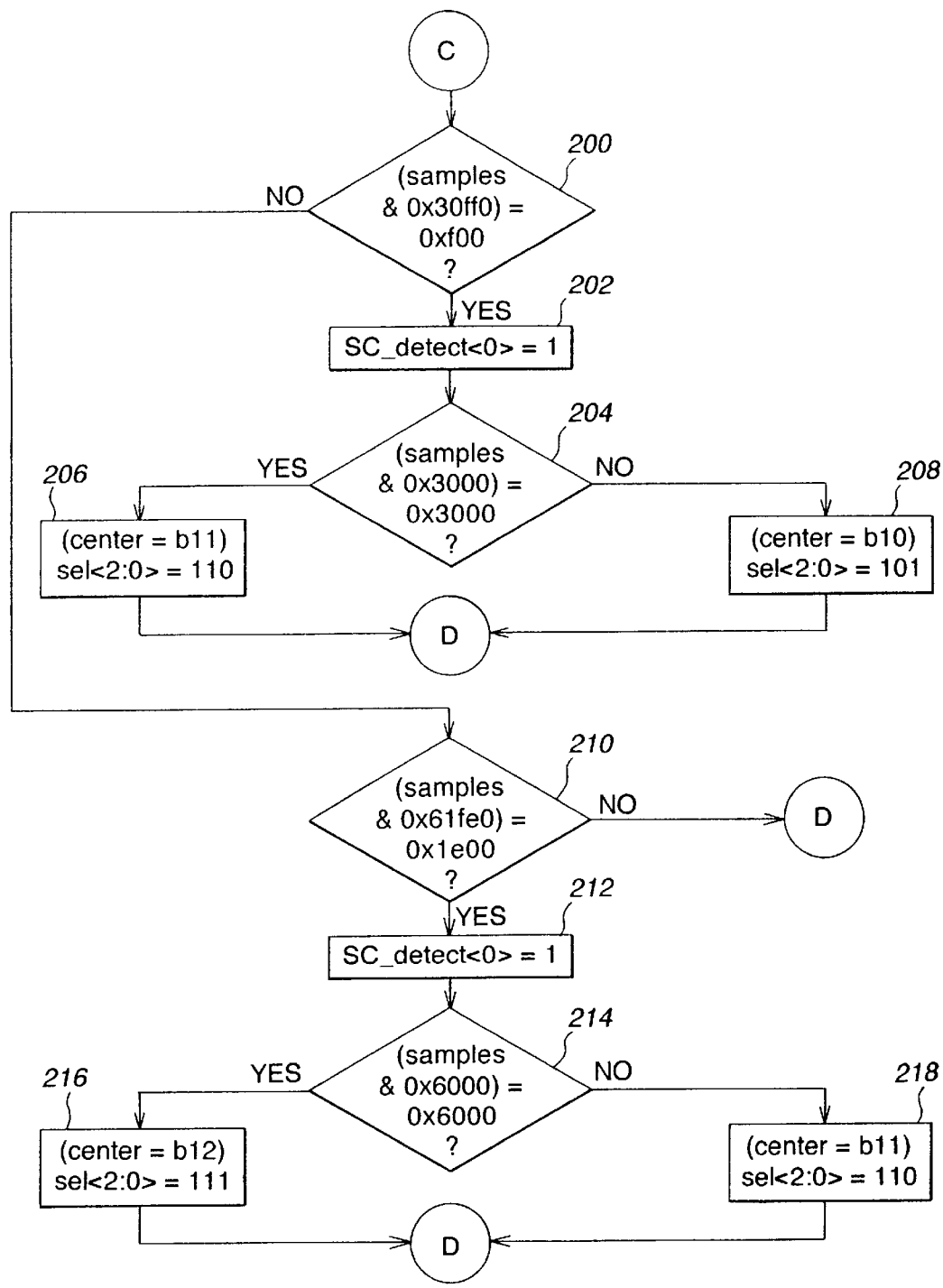

In FIG. 6 there is shown the possible contents of one of the sample registers 56 containing a valid start-of-cell delimiter 45. Starting from a given one of the six sample points, there will exist two '0' samples, followed later by four '1' samples, followed later by four '0' samples. The remaining samples are considered "don't cares", and are marked herein with an 'x'. The start-of-cell detect and center select logic 136 uses the contents of the sample register 56 to determine the presence of a start-of-cell delimiter 45 and to determine which of the bit registers 98–134 within the sample register 56 stores the sample which is closest to the center of the '1' pulse within the start-of-cell delimiter 45. The center of the sampled '1' pulse will be chosen somewhere between b6 (the output of the sample bit register 110 and b12 (the output of the sample bit register 122). The output of this chosen sample bit register will then be selected for use as the de-skewed and synchronized version of the corresponding backplane bus signal 44 for the duration of the data transfer.

The operation of an instance of the start-of-cell detect and center select logic 136 is now described in detail with reference to FIGS. 7 and 8a–d. In FIG. 7 there is shown the instance of the start-of-cell detect and center select logic 136 corresponding to the backplane_data<0> signal. The start-of-cell detect and center select logic 136 includes center select logic 150 which receives the outputs b0–b18 of the sample register 56 corresponding to the backplane_data<0> signal 44a, as well as the EOC and SC_error signals 144 and 142 from the control logic 138. The center select logic 136 produces as output the SC_detect<0> signal 140, and select signals sel<2:0>. The sel<2:0> signals feed the control inputs of a multiplexer 152. The sel<2:0> signals select one of the sample register 56 outputs b<12:6> or a logic 0 to drive the multiplexer output signal center_data<0>.

Referring now to FIGS. 8a–d, there is shown the process undertaken by the start-of-cell detect and center select logic 136 to identify the start-of-cell delimiter 45 and the center of the '1' pulse for the bus signal backplane_data<0>. Upon reset (step 151), the SC_detect<0> signal is deasserted and the sel<2:0> outputs are set to a logic '0' (step 152). If the EOC and SC_error signals are deasserted (steps 154 and 156), and if the SC_detect<0> signal has not yet been asserted (step 158), then the contents of the sample register 56 is masked (logically ANDed) with a mask value of 0x30ff, thus allowing the data samples at bit locations b13, b12, and b7–b0 to be examined for a valid start-of-cell delimiter 45. The result of the masking function is then compared to the value '0xf0' (step 160). A match indicates that locations b13 and b12 contain a logic 0 and therefore a valid leading '0', and that locations b7–b4 contain a logic '1' and therefore indicate a valid '1' pulse, and that locations b3–b0 contain a logic '0' and therefore indicate a valid trailing '0' pulse. The SC_detect<0> signal is then asserted (step 162). The sample register 56 contents is then masked with the value 0x300, and compared with the value 0x300 (step 164). A match indicates that bits b9 and b8 contain a logic '1' and that the center '1' pulse is at least 6 samples long. In this case, the center of the '1' pulse is chosen at b7 (step 166). The sel<2:0> signals are driven with a value of '010' to select the third input to the multiplexer 152, thereby driving the b7 signal from the sample register 56 onto the output center_data<0> signal. On the other hand, no match indicates that the '1' pulse is no greater than 5 samples long. The center of the '1' pulse in this case is chosen at b6 (step 168). The sel<2:0> signals are in this case driven with a value of '001' to select the second input to the multiplexer 152, thereby driving the b6 signal from the sample register 56 onto the output center_data<0> signal. After a center bit is selected, the center select logic 150 returns to step 154. Since the SC_detect<0> signal is now asserted (step 158), the logic awaits either the assertion of the EOC signal, indicating the end of the current data transfer (step 154), or the assertion of the SC_error signal (step 156). Upon the assertion of either signal, the logic resets the SC_detect<0> signal and the sel<2:0> signals (step 152) and the process is repeated.

the event that in the mask comparison at step 160 failed, the contents of the sample register 56 is instead masked with a value '0x61fe' to examine the data samples at bit locations b14, b13, and b8–b1 for a valid start-of-cell delimiter. The result of the masking function is compared with a value 0x1e0 (step 170). A match, as above, indicates a valid start-of-cell delimiter and therefore the SC_detect<0> signal is asserted (step 172). The contents of the sample register 56 is then compared with a value 0x600 in order to determine the width of the '1' pulse (step 174). A match indicates that bits b10 and b9 contain a logic '1' and that the center '1' pulse is at least 6 samples long. In this case, the center of the '1' pulse is chosen at b8 (step 176). The sel<2:0> signals are driven with a value of '011' to select the fourth input to the multiplexer 152, thereby driving the b8 signal from the sample register 56 onto the output center_data<0> signal. No match indicates that the '1' pulse is no greater than 5 samples long. The center of the '1' pulse in this case is chosen at b7 (step 178). The sel<2:0> signals are then driven with a value of '010' to select the third input to the multiplexer 152, thereby driving the b7 signal from the sample register 56 onto the output center_data<0> signal.

This comparison process is repeated for the remaining possible sample register 56 contents in the same manner. If the mask comparison at step 170 failed, then a mask value of 0xc3fc is used (step 180) and compared to a value of 0x3c0. A match indicates a valid start-of-cell delimiter, and the SC_detect<0> signal is asserted (step 182). A mask of 0xc00 is then applied to determine whether the center of the '1' pulse is at b9 or b8 (step 184). If the center of the '1' pulse is at b9, the sel<2:0> lines are driven with a value of '100' to select the fifth input to the multiplexer 152, thereby driving the b9 signal from the sample register 56 onto the output center_data<0> signal. If the center of the '1' pulse is at b8, the sel<2:0> lines are driven with a value of '011' to select the fourth input to the multiplexer 152, thereby driving the b8 signal from the sample register 56 onto the output center_data<0> signal.

If the mask comparison at step 180 failed, then a mask value of 0x187f8 is used (step 190) and compared to a value of 0x780. A match indicates a valid start-of-cell delimiter. The SC_detect<0> signal is then asserted (step 192). A mask of 0x1800 is then applied to determine whether the center of the '1' pulse is at b10 or b9 (step 194). If the center of the '1' pulse is at b10, the sel<2:0> lines are driven with a value of '101' to select the sixth input to the multiplexer 152, thereby driving the b10 signal from the sample register 56 onto the output center_data<0> signal. If the center of the '1' pulse is at b9, the sel<2:0> lines are driven with a value of '100' to select the fifth input to the multiplexer 152, thereby driving the b9 signal from the sample register 56 onto the output center_data<0> signal.

If the mask comparison at step 190 failed, then a mask value of 0x30ff0 is used (step 200) and compared to a value of 0xf00. A match indicates a valid start-of-cell delimiter, and the SC_detect<0> signal is asserted (step 202). A mask of 03000 is then applied to determine whether the center of the '1' pulse is at b11 or b10 (step 204). If the center of the '1' pulse is at b11, the sel<2:0> lines are driven with a value of '110' to select the seventh input to the multiplexer 152, thereby driving the b11 signal from the sample register 56 onto the output center_data<0> signal. If the center of the '1' pulse is at b10, the sel<2:0> lines are driven with a value of '101' to select the sixth input to the multiplexer 152, thereby driving the b10 signal from the sample register 56 onto the output center_data<0> signal.

Finally, if the mask comparison at step 200 failed, then a mask value of 0x61fe0 is used (step 210) and compared to a value of 0x1e00. A match indicates a valid start-of-cell delimiter, and the SC_detect<0> signal is asserted (step 212). A mask of 06000 is then applied to determine whether the center of the '1' pulse is at b12 or b11 (step 214). If the center of the '1' pulse is at b12, the sel<2:0> lines are driven with a value of '111' to select the eighth input to the multiplexer 152, thereby driving the b12 signal from the sample register 56 onto the output center_data<0> signal. If the center of the '1' pulse is at b11, the sel<2:0> lines are driven with a value of '110' to select the seventh input to the multiplexer 152, thereby driving the b11 signal from the sample register 56 onto the output center_data<0> signal.

If all of the above comparisons fail, then no start-of-cell delimiter is present. In this case, the SC_detect<0> signal remains deasserted, and the sel<2:0> signals remain driven to a value of '000', thereby driving a logic '0' level onto the center_data<0> signal.

Referring to back to FIG. 3, each instance of start-of-cell detect and center select logic 136 provides as output on one of lines center_data<frame>, center_data<parity>, or center_data<7:0> the contents of the sample register bit in the corresponding sample register 56 which represents the approximate center sample of the '1' pulse in the start-of-cell delimiter 45 for the corresponding backplane_data signal. The lines center_data<frame>, center_data<parity>, and center_data<7:0> lines are used by the switch module as the de-skewed and synchronized versions of the corresponding backplane bus signals 44 for the duration of the data transfer.

Figure 9:
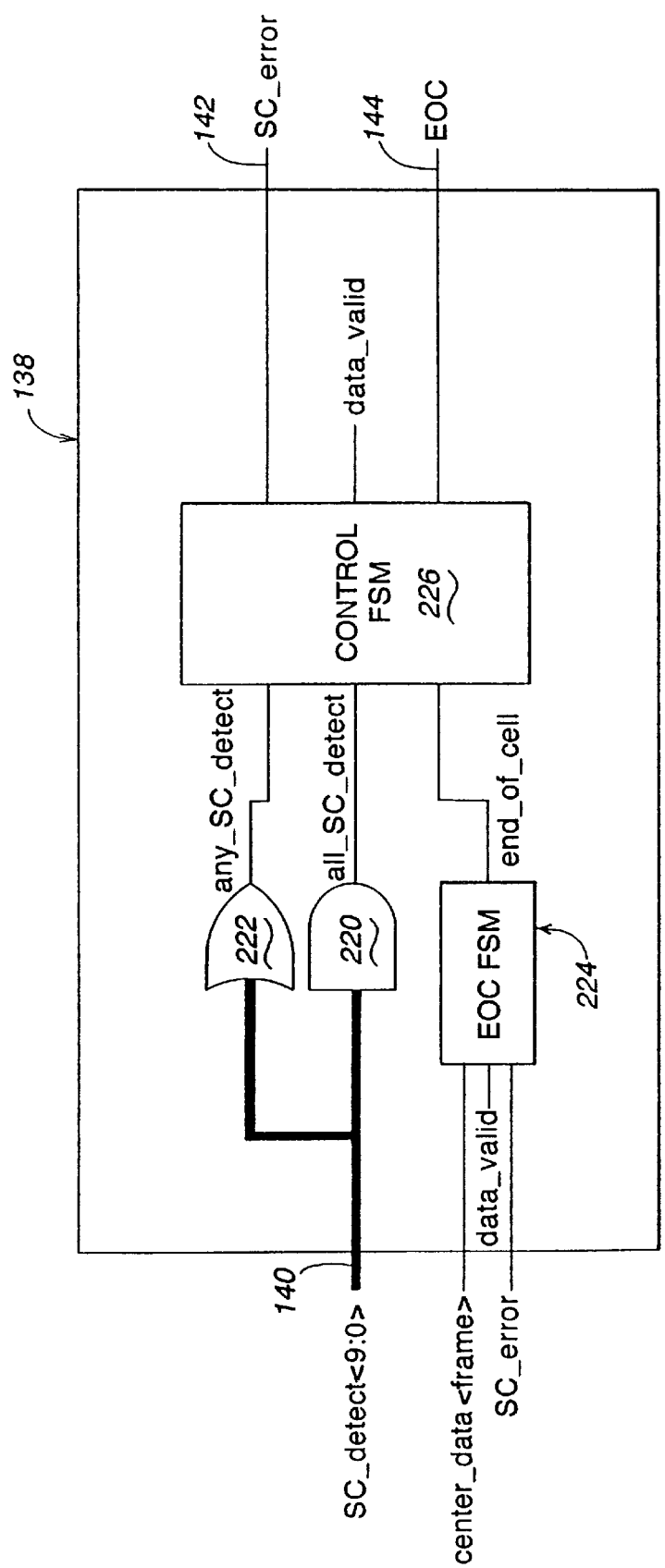
FIG. 9 is a block diagram of the control logic shown in FIG. 3.

Meanwhile, the control logic 138 monitors the SC_detect<9:0> signals and the center_data<frame> signal to 1) check for bus errors and 2) determine the end of the data transfer in order to reset the start-of-cell detect and center select logic 136. The control logic 138 is shown in further detail in FIG. 9. The SC_detect<9:0> signals are fed to an AND function 220, which asserts an output all_SC_detect signal in the event that all_SC_detect<9:0> signals are asserted. The SC_detect<9:0> signals are also fed to an OR function 222, which asserts an output any_SC_detect signal in the event that any of the SC_detect<9:0> signals are asserted. An EOC FSM 224 monitors the center_data<frame> signal as well as the SC_error signal and a data valid signal, and produces as output an end_of_cell signal. The any_SC_detect, all_SC_detect, and end_of_cell signals are fed to the control FSM 226, which produces the SC_error, data_valid, and EOC signals.

Figure 10:
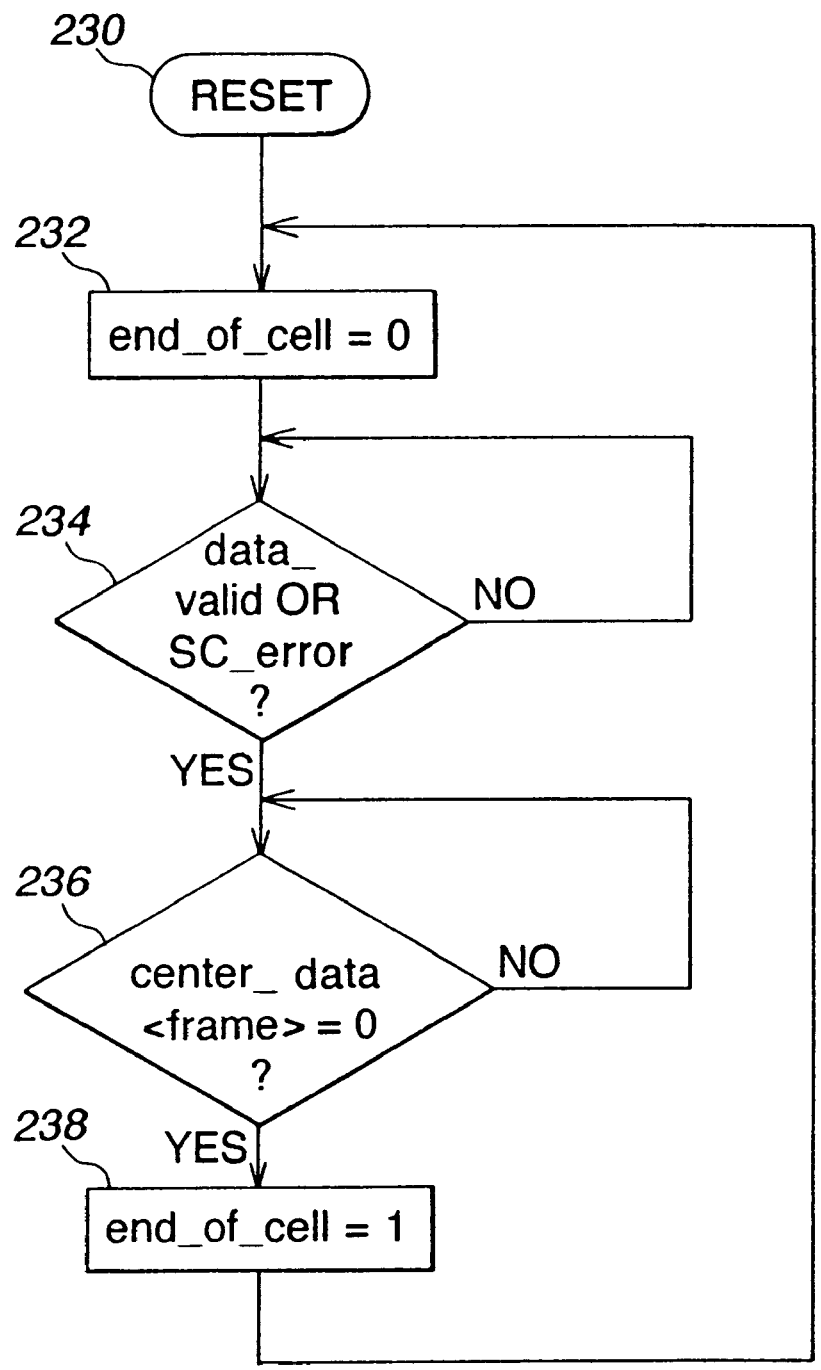
FIG. 10 is a flow diagram of the EOC FSM shown in FIG. 8.

The EOC FSM 224 operates as shown in FIG. 10. Accordingly, upon a reset (step 230) the end_of_cell signal is deasserted (step 232). The EOC FSM then awaits the assertion of either the data_valid signal or the SC_error signal (step 234). Upon assertion of either of these signals, the center_data<frame> bit is monitored (step 236). When this bit is found to be at a logic '0', the end_of_cell signal is asserted (step 238).

Figure 11:
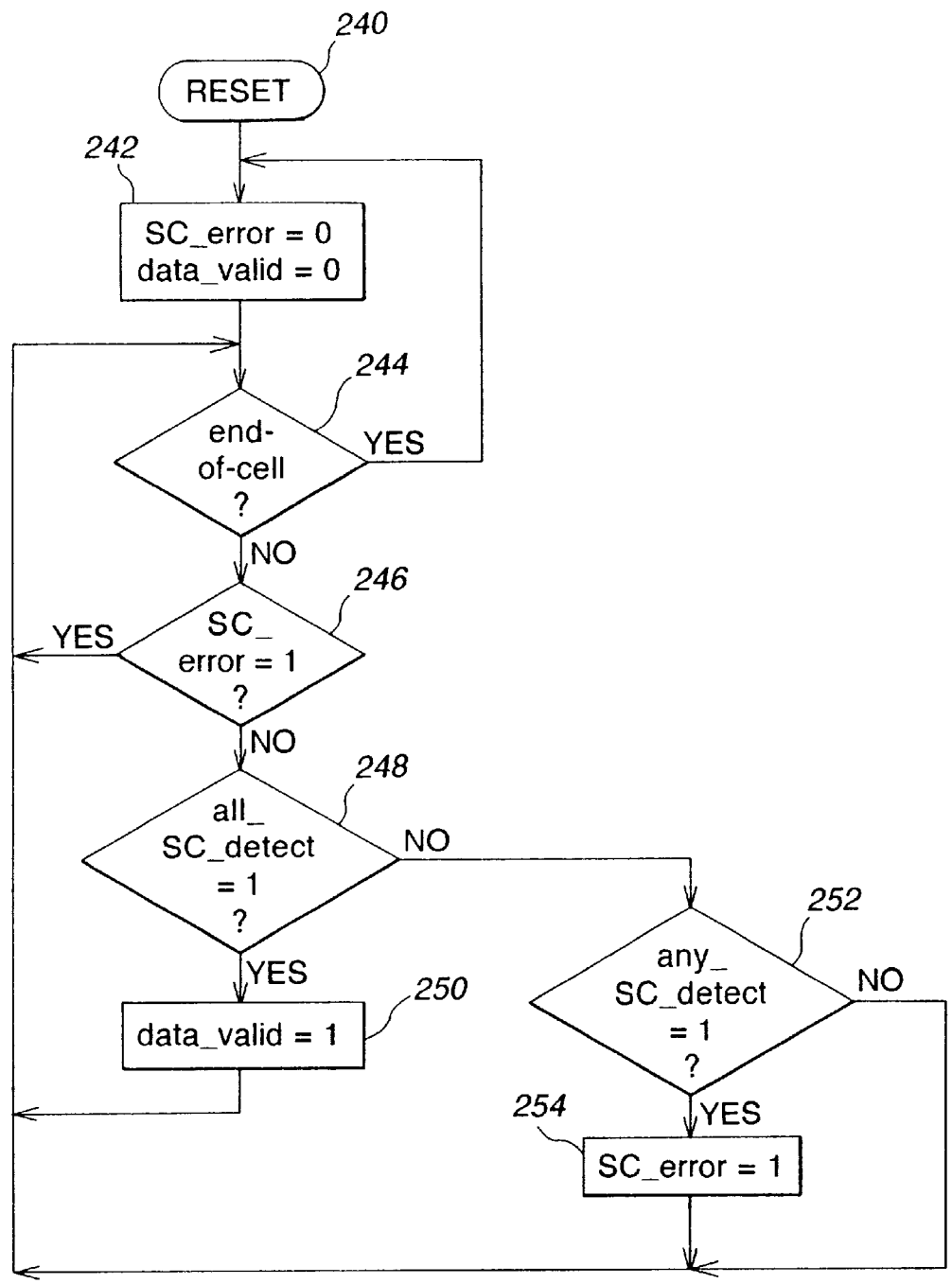
FIG. 11 is a flow diagram representing the operation of the control FSM shown in FIG. 8.

The control FSM 226 operates as shown in FIG. 11. Upon a reset (step 240), the SC_error and data_valid signals are deasserted (step 242). If the EOC and SC_error signals are deasserted (steps 244 and 246), as they will be at the beginning of a data transfer, the all_SC_detect signal is checked (step 248). If the all_SC_detect signal is asserted, then all start-of-cell delimiters have been asserted during the same local clock period. The data_valid signal is then asserted (step 250). The data_valid signal will remain asserted until the end_of_cell signal is asserted by the EOC FSM 224 (step 244). When the end_of_cell signal is asserted, the SC_error and data_valid signals are deasserted (step 242) and the process repeated.

If the all_SC_detect signal is not asserted (step 248), then the any_SC_detect signal is checked (step 252). If this signal is asserted, then some but not all start_of_cell delimiters 45 were detected on the backplane bus signals 44 during a single local clock 36 period. In this particular embodiment, this is considered a bus error; thus, the SC_error signal is asserted (step 254). The SC_error signal remains asserted until the end of the data transfer, as indicated by the assertion of the end_of_cell signal (step 244). Upon assertion of the end_of_cell signal, the SC_error bit is reset.

Figure 12:
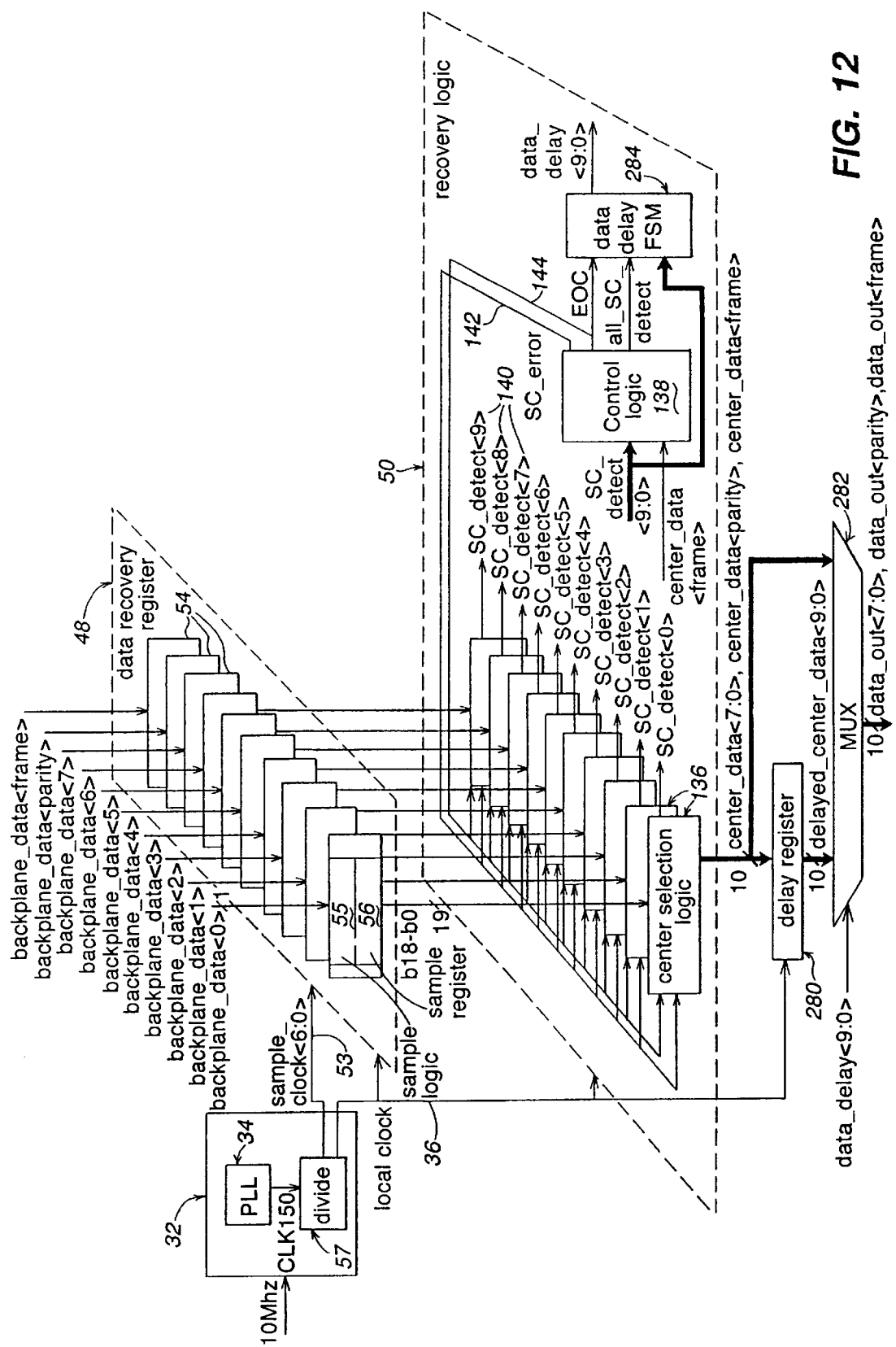
FIG. 12 is a block diagram of the deskew logic showing additional components to correct for bus skew of greater than one bit time.

According to a further aspect of the invention, data can be recovered even when there is more than one bit time of skew between the backplane bus signals 44. Referring now to FIG. 12, the de-skew logic is modified in that there is added a delay register 280 clocked by the local clock 36. The delay register 280 accepts as input the center_data signals from the recovery logic 50, and provides as output corresponding delayed_center_data signals. The center_data signals and the delayed_center_data signals feed a multiplexer 282 which produces as output data_out<7:0>, data_out<parity>, and data_out<frame> signals. The recovery logic 50 is modified to include delay logic, herein shown as a data delay FSM 284, for determining that some of the start-of-cell delimiters were stored in their sample registers a local clock cycle prior to the remaining start-of-cell delimiters. The data_delay FSM 284 provides output signals data_delay<9:0> which drive the multiplexer 282 select inputs. The data_delay FSM 284 and multiplexer 282 thereby form delay logic for driving onto the output signals data_out<7:0>, data_out<parity>, and data_out<frame>, the delayed signals delayed_center_data corresponding to the data signals for which the start-of-cell delimiter arrived first, and the center_data signals corresponding to the data signals for which a start-of-cell delimiter was stored a local clock cycle later than the other start-of-cell delimiters.

Figure 13:
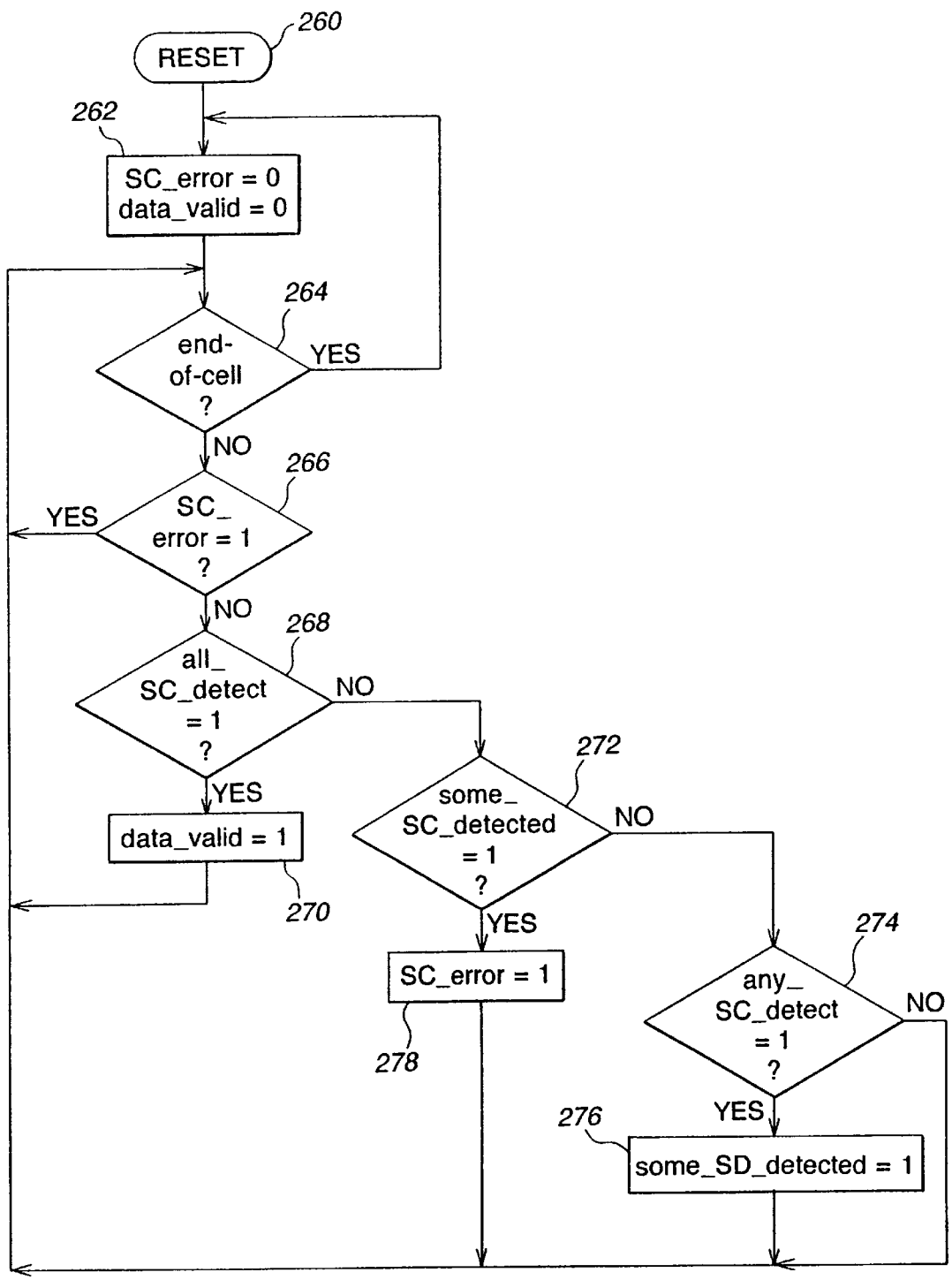
FIG. 13 is a flow diagram of the control logic as shown in FIG. 11, as modified to correct for bus skew of greater than one bit time.

The control FSM 226 portion of the control logic 138 is modified as shown in the flow diagram of FIG. 13. Upon a reset (step 260), the SC_error and data_valid signals are deasserted (step 262). If the EOC and SC_error signals are deasserted (steps 264 and 266), as they will be at the beginning of a data transfer, the all_SC_detect signal is checked (step 268). As previously described, if the all_SC_detect signal is asserted, then all start-of-cell delimiters have been asserted during the same local clock period. The data_valid signal is then asserted (step 270). The data_valid signal will remain asserted until the end_of_cell signal is asserted by the EOC FSM 224 (step 244). When the end_of_cell signal is asserted, the SC_error and data_valid signals are deasserted (step 242) and the process repeated.

If the all_SC_detect signal is not asserted (step 248), then a some_SC_detected signal is checked (step 272). If this signal is deasserted, then the any_SC_detect signal is checked (step 274). Assertion of the any_SC_detect signal indicates that some but not all start_of_cell delimiters 45 were detected on the backplane bus signals 44 during a single local clock 36 period. In this case, the some_SC_detected signal is asserted (step 276) and the control FSM 226 returns to step 264. On the following clock cycle, if the end_of_cell and SC_error signals are deasserted, the all_SC_detect signal is again checked (step 268). If the remaining start_of_cell delimiters 45 have become asserted, then this signal will be asserted and the data_valid signal asserted in response (step 270). If, however, the all_SC_detect signal is deasserted, and the some_SC_detected signal is asserted (step 272), then all start_of_cell delimiters have not been detected within the last two local clock cycles. In the particular embodiment shown, this is considered a bus error; thus, the SC_error signal is asserted (step 278), and remains so until assertion of the end_of_cell signal indicates the end of the data transfer (step 264).

Figure 14:
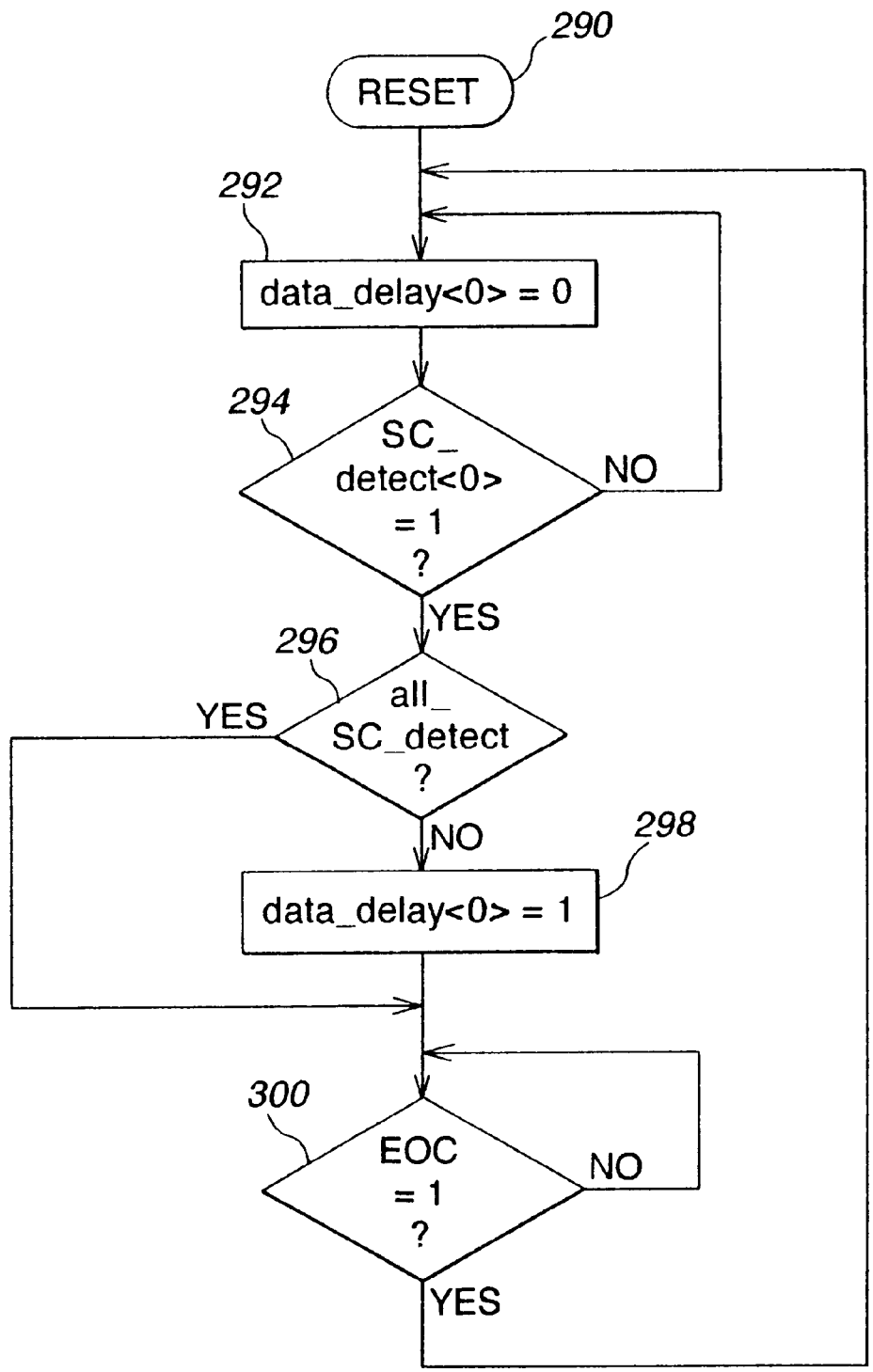
FIG. 14 is a flow diagram of the data_delay FSM as shown in FIG. 11.

The data_delay FSM 284 operates as shown In FIG. 14. There are 10 instances of this logic within the data_delay FSM 284, each instance generating one of the data_delay<9:0> signals. Only one such instance of the logic is shown here—that which generates the data_delay<0> signal. Accordingly, upon reset (step 290), the data_delay<0> signal is reset at a logic '0' (step 242), thereby passing the center_data<0> signal through the multiplexer 282 to the output data_out<0> signal. The logic then waits for the assertion of the SC_detect<0> signal (step 294). If the all_SC_detect signal is asserted at this point (step 296), then either all start-of-cell delimiters were received during the same local clock cycle, in which case no data should be delayed, or the start-of-cell delimiter associated with the backplane_data<0> signal was received one local clock cycle later than other start-of-cell delimiters and therefore should not be delayed. Thus, the data_delay<0> signal remains asserted at a logic '0'. If, on the other hand, the SC_detect<0> signal is asserted, but the all_SC_detect signal is not asserted, then this start-of-cell delimiter has been received one local clock cycle before some other start-of-cell delimiters, and therefore the data associated with the backplane_data<0> signal should be delayed. In this case, the data_delay<0> signal is asserted to a logic '1' (step 298), thereby passing the delayed_center_data<0> signal through the multiplexer 282 to the output data_out<0> signal. The data_delay FSM 284 then awaits assertion of the EOC signal (step 300), indicating the end of the data transfer.

It is noted here that, though the preferred embodiment allows full data recovery when there is a single bit time of skew between the bus signals 44, and flags any skew between bus signals 44 greater than 1 bit time as an error, one skilled in the art will recognize that the principles of the invention can be easily applied to allow recovery of data even when there is more than one bit time of skew between the backplane bus signals 44.

Though the invention has been described herein with reference to the preferred embodiment, one skilled in the art will realize its broader applications. For instance, though the backplane bus herein described implements non-continuous data transfers—that is, data transfers that are separated by idle time where there is no activity on the bus, the novel concepts can easily be applied to a continuous system. In a continuous system, the bus is continuously active, and data transfers are typically encoded for example by a 4B/5B or 8B/10B encoding scheme. Data transfers are delimited by control codes which do not occur in the data portion of the transfer. The invention can be easily adapted to deskew data by operating on these control codes in the same manner that it employs the start-of-cell delimiters herein described.

Furthermore, where it is known for a particular application that data line to data line skews will be relatively small, while data line to receive clock skews will be more significant, the invention may be employed such that the start-of-cell detection and center selection logic operates on a start-of-cell delimiter on only a single data line, using the resulting center sample as the sample point for all data lines.

Implementation of the present invention can also provide significant advantages at the system level. It can be seen that the invention herein described eliminates the previously required strict phase relationship between transmit and receive clocks. Therefore, though the local clocks on the switching modules are herein described as generated from a commonly shared master clock driven over the backplane bus 14, where cell lengths or lengths of data transmissions are bounded, the novel deskew logic can enable implementation of separate, unrelated local clocks on the switching modules.

What is claimed is:

1. An apparatus for receiving data from a parallel data bus which transfers the data at a bus clock rate, the parallel data bus comprising a plurality of data lines, a data signal transfer on the parallel data bus being preceded by a start-of-cell delimiter consisting of a predetermined sequence of pulses transferred at the bus clock rate on each of the data lines, the apparatus comprising:

sampling logic for sampling the data signal on each of the data lines at a sampling rate which is higher than the bus rate;

a sample register which, for each of the data lines on the bus, stores a plurality of samples of the respective data signal, the number of samples stored being large enough to store at least some of the pulses constituting the respective start-of-cell delimiter, the sample register outputting the stored samples synchronous with a local clock operating at the bus clock rate;

start-of-cell detection logic which, for each of the data lines on the bus, determines that a start-of-cell delimiter is output by the respective sample register; and center selection logic responsive to the start-of-cell detection logic which, for each of the data lines on the bus, determines which one of the samples output by the sample register represents an approximate center sample of one of the pulses of the start-of-cell delimiter for that data line, the center selection logic outputting the approximate center sample determined for each of the data lines on the bus.

2. An apparatus for receiving time skewed data from a parallel data bus, the parallel data bus comprising a plurality of data lines, a data signal transfer on the parallel data bus being preceded by a start-of-cell delimiter consisting of a predetermined sequence of pulses transferred at a bus clock rate on each of the data lines, the apparatus comprising:

a local clock operating at a local clock rate;

sampling logic for sampling each of the data lines at a sampling rate which is higher than the local clock rate;

a plurality of sample registers coupled to the sampling logic, each sample register corresponding to one of the data lines, each sample register storing a plurality of samples of the corresponding data signal, the number of samples stored being large enough to store at least some of the pulses constituting the respective start-of-cell delimiter; the output of the sample register being synchronous with the local clock; and start-of-cell detect and center select logic coupled to the sample registers, the start-of-cell detect and center select logic for determining that a start-of-cell delimiter is output by each of the sample registers, and for determining which one of the samples stored in each of the sample registers represents an approximate center sample as determined for each sample register.

3. An apparatus for receiving data from a parallel data bus which transfers information at a bus clock rate, the parallel data bus comprising a plurality of data lines, a data signal transfer on the parallel data bus being preceded by a start-of-cell delimiter consisting of a predetermined sequence of pulses transferred at the bus clock rate on each of the data lines, the apparatus comprising:

sampling logic for sampling each of the data lines at a sampling rate which is higher than the bus clock rate;

a sample register which, for each of the data lines on the bus, stores a plurality of samples of the data signal, the number of samples stored being large enough to store at least some of the pulses constituting the start-of-cell delimiter;

start-of-cell detection logic which, for each of the data lines on the bus, determines that a start-of-cell delimiter is stored in the respective sample register;

center selection logic coupled to the start-of-cell detection logic which, for each of the data lines on the bus, determines which one of the samples stored in the sample register represents an approximate center sample of one of the pulses of the start-of-cell delimiter for that data line, the center selection logic outputting the center samples determined for each of the data lines on the bus;

a delay register accepting as input the approximate center samples provided by the center selection logic and providing a plurality of delayed data signals, each delayed data signal corresponding to a respective one of the data signals on the bus, wherein the delayed data signals are synchronous with a local clock signal; and delay logic for determining that some of the start-of-cell delimiters were stored in the sample register a local clock cycle prior to remaining start-of-cell delimiters, the delay logic producing as output the delayed signals corresponding to the data signals for which a start-of-cell delimiter was stored a local clock cycle prior to the other start-of-cell delimiters, and producing as output center samples corresponding to the other data signals.

4. The apparatus of claim 1, further comprising:

a local clock operating at a local clock rate approximately the same as the bus clock rate.

5. The apparatus of claim 4, further comprising:

a delay register accepting as input the center samples output by the center selection logic and providing a plurality of delayed data signals, each delayed data signal corresponding to one of the data signals on the bus, wherein the delayed data signals are synchronous with the local clock.

6. The apparatus of claim 5, further comprising:

delay logic to determine that at least a first of the start-of-cell delimiters was stored in one of the sample registers a local clock cycle prior to the remaining start-of-cell delimiters, the delay logic producing as output the delayed signals corresponding to the data signals for which a start-of-cell delimiters was stored a local clock cycle prior to the other start-of-cell delimiters, and producing as output the center samples corresponding to the other data signals.

7. The apparatus of claim 4, further comprising:

control logic to control the outputting of the center samples from the center selection logic, wherein, if the control logic determines that all of the sample registers have output start-of-cell delimiters within a certain time period, the control logic permits the center selection logic to output the center samples.

8. The apparatus of claim 7, wherein the control logic does not permit the outputting of the center samples if the control logic determines either that not every sample register has output a start-of-cell delimiter within the certain time period or that an end-of-cell indicator has been output by one of the sample registers.

9. The apparatus as recited in claim 2, wherein the approximate center sample is located approximately at a center of the start-of-cell delimiter.

10. A method of deskewing data received on a parallel data bus comprising a plurality of data lines, wherein the data is transferred at a bus clock rate, and wherein data is preceded by a start-of-cell delimiter consisting of a predetermined sequence of pulses on each of the data lines, the method comprising:

determining that a start-of-cell delimiter is present on each of the data lines of the bus; and responsive to determining that the start-of-cell delimiter is present on each of the data lines on the bus, determining an approximate center of each start-of-cell delimiter.

11. The method as recited in claim 10, further comprising:

sampling the data signal on each of the data lines at a sampling rate to generate a plurality of samples of the data signal.

12. The method as recited in claim 11, wherein the sampling rate is higher than the bus rate.

13. The method as recited in claim 11, further comprising:

storing a plurality of samples for each respective data signal, the number of samples stored being large enough to store at least some of the pulses constituting the respective start-of-cell delimiter; and outputting the stored samples synchronous with the bus clock.

14. The method as recited in claim 13, further comprising:

determining which one of the outputted samples represents an approximate center sample of one of the pulses of the start-of-cell delimiter for each data line; and outputting the determined approximate center sample for each of the data lines on the bus.

15. A method of receiving data from a parallel data bus which transfers information at a bus clock rate, the parallel data bus comprising a plurality of data lines, a data signal transfer on the parallel data bus being preceded by a start-of-cell delimiter consisting of a predetermined sequence of pulses transferred at the bus clock rate on each of the data lines, the method comprising:

sampling each of the data signals at a rate which is higher than the bus clock rate;

storing a plurality of samples of each data signal in a sample register corresponding to the data line, the number of samples stored being large enough to store at least some of the pulses constituting the start-of-cell delimiter;

determining for each data signal that a start-of-cell delimiter is output by the sample register corresponding to the data signal;

in response to detecting the start-of-cell delimiter for each data signal, determining which of the samples output by the sample register corresponding to the data signal represents an approximate center sample of one of the pulses of the start-of-cell delimiter for that data signal; and outputting on the bus the center samples determined for each of the data signals.

16. The method of claim 15, further comprising:

controlling the output of the center samples from the center selection logic;

determining whether all of sample registers have output start-of-cell delimiters within a certain time period; and if all of sample registers have output start-of-cell delimiters within a certain time period, permitting the outputting of the center samples on the bus.

17. The method of claim 16, wherein the outputting of the center samples is not permitted if either not every sample register has output a start-of-cell delimiter within the certain time period or an end-of-cell indicator has been output by one of the sample registers.

18. The method of claim 15, further comprising:

maintaining a local clock having a local clock rate approximately the same as the bus clock rate, wherein each sample register outputs the stored samples synchronous with the local clock rate.

19. The method of claim 18, further comprising:

receiving as input of a delay register the center samples output by the center selection logic; and producing as output a plurality of delayed data signals, each delayed data signal corresponding to a received center sample, wherein the delayed data signals are output synchronous with the local clock rate.

20. The method of claim 19, further comprising:

determining that at least a first of the start-of-cell delimiters was stored in one of the sample register a local clock cycle prior to the remaining start-of-cell delimiters; and producing as output to the bus the delayed signals corresponding to the data signals for which a start-of-cell delimiters was stored a local clock cycle prior to the other start-of-cell delimiters and the center samples corresponding to the other data signals.

* * * * *